United States Patent [19]

Eberhardt et al.

[11] Patent Number: 5,621,024
[45] Date of Patent: Apr. 15, 1997

[54] PREPARATION OF THERMOPLASTIC POLYURETHANES

[75] Inventors: Peter Eberhardt, Schwarzheide; Ruediger Krech, Diepholz; Udo Rotermund, Ortrand; Klaus Techritz, Bischheim, all of Germany

[73] Assignee: BASF Schwarzheide GmbH, Germany

[21] Appl. No.: 542,274

[22] Filed: Oct. 12, 1995

[30] Foreign Application Priority Data

Oct. 20, 1994 [DE] Germany .................. 44 37 586.7

[51] Int. Cl.$^6$ .................................................. C08G 18/08
[52] U.S. Cl. ............... 523/324; 528/44; 264/211.23; 264/211.24
[58] Field of Search ............... 523/324; 264/211.23, 264/211.24; 528/44

[56] References Cited

U.S. PATENT DOCUMENTS

| | | | |
|---|---|---|---|
| 3,963,679 | 6/1976 | Ullrich et al. | 264/211 |
| 4,250,292 | 2/1981 | Niederdellmann et al. | 528/44 |
| 5,391,682 | 2/1995 | Ogawa | 528/59 |

FOREIGN PATENT DOCUMENTS

| | | |
|---|---|---|
| 0010601 | 5/1980 | European Pat. Off. . |
| 0571828 | 12/1993 | European Pat. Off. . |

OTHER PUBLICATIONS

EPO Search Report dated Jun. 3, 1996; Translation of EPO Search Report.

*Primary Examiner*—Rachel Gorr
*Attorney, Agent, or Firm*—Mary E. Golota

[57] ABSTRACT

The present invention relates to a process for the preparation of thermoplastic polyurethane by reacting a) organic and/or modified organic polyisocyanates with b) at least one oligomeric polyhydroxy and/or polyamino compound having an average molecular weight of from 400 to 10,000 g/mol, in the presence or absence of c) chain extenders having at least two Zerewitinoff-active hydrogen atoms and an average molecular weight of less than 400 g/mol, d) catalysts, e) compounds which are less than difunctional with respect to isocyanates and/or isocyanates which are less than difunctional and, f) assistants and/or additives, in a twin-screw extruder in which both screws rotate in the same direction and which has a length of/diameter ratio of from 20 to 6 and discharging the resulting thermoplastic polyurethane from the extruder with shaping.

17 Claims, No Drawings

PREPARATION OF THERMOPLASTIC POLYURETHANES

BACKGROUND OF THE INVENTION

The present invention relates to a process for the preparation of thermoplastic polyurethanes by reacting a) organic and/or modified organic polyisocyanates with b) at least one oligomeric polyhydroxy and/or polyamino compound having an average molecular weight of from 400 to 10 000 g/mol, in the presence or absence of c) chain extenders having at least two Zerewitinoff-active hydrogen atoms and an average molecular weight of less than 400 g/mol, d) catalysts, e) compounds which are less than difunctional with respect to isocyanates and/or isocyanates which are less than difunctional and f) assistants and/or additives in a twin-screw extruder in which both screws rotate in the same direction and which has a length/diameter ratio of from 20 to 60, and discharging the resulting thermoplastic polyurethane from the extruder with shaping.

The preparation of plastics in extruders is generally known. In contrast to the processing of plastics by a purely thermoplastic method, the term reactive extrusion is used in the case of such polymer syntheses in an extruder. Accordingly, the extruder used as the chemical reactor is frequently also referred to as a reaction extruder.

In the monograph Reactive Extrusion: principles and practice by MARINO XANTHOS (Editor), published by Hanser Verlag, Munich, Vienna, New York, Barcelona (1992), important, hitherto known aspects of reaction extrusion are described. The synthesis of polyurethanes in the reaction extruder is described in Section 4.2.3a, page 87 et seq., of the stated monograph. The production of the prior art polyurethanes relevant to the invention is described in Kunststoff-Handbuch, Volume VII, Editors VIEWEG and HÖCHTLEN, Carl Hanser-Verlag Munich, 1966, and in the subsequent Volume 7, Editors BECKER and BRAUN, Carl Hanser-Verlag, Munich, Vienna, 1993. Most of these substances have a more or less elastomeric character.

Various processes are known for the industrial production of polyurethanes in the reaction extruder and are described, for example, in DE-A-20 59 570, 23 02 564, 24 37 764, 24 47 368, 25 49 372, 28 42 806, 28 54 409, 29 25 944, 39 31 419, 40 17 571 and 42 02 973.

Virtually without exception, the literature recommends the twin-screw extruder in which both screws rotate in the same direction, for the synthesis of polyurethanes. Single-screw extruders and twin-screw extruders having counter-rotating screws are evidently unsatisfactory owing to the poor mixing effect during passage through the extruder, and extruders having more than two screws are too expensive.

Shortly after the raw materials required for the synthesis have been fed into the extruder, the reaction mixture has a very low viscosity and the mixing effect of the extruder screws in the conventional processes is poor in this phase. Inhomogeneities which vary in extent are formed in the polyurethane melt.

The avoidance of inhomogeneities by means of special designs of the screw geometry is described in a number of German Laid-Open Applications, for example in DE-A-23 02 564, 24 23 764, 25 49 372 and 28 42 806. The common feature of these processes is a screw configuration with a large number of kneading elements which have a highly shearing action and in particular introduce a considerable amount of energy into the reaction melt in a critical reaction phase in which the reacting mixture has viscosities of from 10 to 100 Pa.s. In the stated monograph by M. XANTHOS (Editor), Bruce BROWN likewise presents this configuration, the large amount of kneading units in 3 zones being regarded as the key to the success of this process. Virtually all subsequent publications on the synthesis of polyurethane elastomers start from this screw configuration or from a similar configuration of the extruder screws with a relatively large number of highly shearing kneading elements which have an intensive action on the reaction mixture at relatively high melt viscosities above 10 Pa.s.

Although gel-like nodules can be more or less prevented in the stated manner using this screw configuration, insoluble deposits which comprise hard segments, are insoluble even in a mixture of dimethylformamide with 1 percent of di-n-butylamine, become detached gradually and cause considerable contamination, particularly in the case of harder formulations, form particularly on the kneading elements, especially after the extruder has been running for a relatively long time, ie. for several hours or days. When a melt filter is used, these particles, which are often dark but may also be lighter, are not always completely retained since, owing to their resilience and deformability, they can even pass through filters having a small mesh size and can remain in the polyurethane and are at least visually unattractive.

Only a short time after the beginning of the synthesis, ie. after the extruder has been running for about 2 hours, the amount of inhomogeneities which is retainable on the melt filter having a mesh size of 42 μm is more than 10 grams per ton of melt. After a longer machine running time of from about 15 to 20 hours, this value often increases considerably.

Even if these impurities can be retained with the aid of a melt filter, increasing coating of the filter gives rise to pressure rises in the melt, which are very disadvantageous with regard to a uniform course of the polyurethane synthesis and adversely affect the uniformity of the polyurethane quality. The required frequent changing of the filters results not only in product losses but once again in sudden pressure changes with adverse consequences for the polyurethane quality. In the case of contents of more than 1 ppm of inhomogeneities, it is by no means advisable to omit the melt filter since this amount of impurities in the polyurethane is generally no longer tolerated. The attempts to reduce the formation of inhomogeneities to the stated order of magnitude of less than 1 g per ton of melt with the aid of very thorough premixing of the reactants, as described, for example, in DE-A-42 02 973, is also unsuccessful. It is known that separation occurs even from an ideally mixed reaction batch of a polyurethane in the course of the reaction, and hard segments formed from polyisocyanate and chain extenders separate out.

This behavior is described, for example, by G. ZEITLER in the documents of the World Polyurethane Congress of 1987, Verlag Technomic, Lancaster, Basle 1987, page 148 et seq., and also by KNÖNER et al. in Plaste und Kautschuk, 33, page 127 et seq. In the reaction according to the conventional processes for polyurethane synthesis in a twin-screw extruder, in particular, urea groups formed from primary or secondary amines, even from traces of about 0.01% of water in the polyhydroxy compounds with isocyanate, can form inhomogeneities which no longer melt and which far exceed the value of 1 ppm in the synthesis in the reaction extruder.

In WO 91/00304, only a single mixing zone having a high shearing effect in the viscosity range above 100 Pa.s with strongly shearing kneading elements is regarded as essential. Apart from the fact that polyurethanes are prepared without, or virtually without, oligomeric diols or diamines in this manner, it is true both for this special case and for the polyurethanes of elastomeric character, ie. containing a relatively large amount of oligomeric diols, that the proposed screw geometry and the associated process conditions permit the production only of polyurethane melts having more than 10 g of inhomogeneities per ton.

Maintaining a constant viscosity according to DE-A-20 59 570 requires a reduction in the temperature in upstream zones of the extruder with polyisocyanate conversions of less than or slightly more than 50%.

It is known, for example from the stated publication by KNONER et al., that the rate of formation of hard segments, even from ideally mixed reaction batches, passes through a maximum with increasing temperature in this conversion range, which maximum becomes more and more pronounced with increasing isocyanate content at higher temperatures. According to DE-A-20 59 570, a large proportion of conventional formulations for polyurethanes suffer from the risk that, as the temperature in the upstream zones of the extruder decreases, the rate of separation of hard segments increases in a catastrophic manner and an extremely large amount of inhomogeneities are formed.

SUMMARY OF THE INVENTION

It is an object of the present invention to improve the process for the preparation of thermoplastic polyurethanes in the twin-screw extruder so that the amount of inhomogeneities which is retained by a filter having a mesh size of 42 μm is greatly reduced and is as far as possible less than one gram per ton of melt, so that they are no longer detectable in the polyurethane.

We have found that this object is achieved, according to the invention, if the process is carried out in such a way that at least some of the components a) and b) and of the components C) to f) which may also be used are introduced into a first zone ($Z_1$) of the twin-screw extruder, which zone is equipped with single-flight screw conveying elements which are arranged in a length region beginning from 0 to 3/100 and ending at least at 8/100 and at most at 30/100 of the total screw length L, the low-viscosity mixture is then passed through a mixing zone ($Z_2$) having a small shearing effect and comprising double-flight screw conveying elements and/or mixing elements, this mixing zone ($Z_2$) being arranged within a length region from 8/100 to 45/100 with a total length within this region of from 5/100 to 25/100 of the total screw length L, the product is then passed into a retarding zone ($Z_3$) having little shearing effect, this retarding zone ($Z_3$) being arranged within a length region from 20/100 to 50/100 with a total length of the retarding stage within this region of from 0.2/100 to 10/100 of the total screw length L, the polymerization is then carried out at high viscosity in a polymerization zone ($Z_4$) equipped with double-flight conveying screws, the zone ($Z_4$) being present in a length region from 30/100 to 100/100 of the total screw length L, and the polyurethane is discharged, the ratio of the product of the torque M, in [Nm], acting on the extruder shafts, the speed n of the extruder screws in [min$^{-1}$] and the square of the smallest internal diameter of the extruder barrel $D_G$ in [cm] to the free reactor volume V available between the extruder barrel and the screw elements and any other elements as equipment on the extruder shafts in [cm$^3$] being greater than 750.

The present invention therefore relates to a process for the preparation of thermoplastic polyurethanes by reacting a) organic and/or modified organic polyisocyanates with b) at least one oligomeric polyhydroxy and/or polyamino compound having an average molecular weight of from 400 to 10 000 g/mol, in the presence or absence of c) chain extenders having at least two Zerewitinoff-active hydrogen atoms and an average molecular weight of less than 400 g/mol, d) catalysts, e) compounds which are less than difunctional with respect to isocyanates and/or isocyanates which are less than difunctional and f) assistants and/or additives in a twin-screw extruder in which both screws rotate in the same direction and which has a length/diameter ratio of from 20 to 60, and discharging the resulting thermoplastic polyurethane from the extruder with shaping, wherein at least some of the components a) and b) and of the components c) to f) which may also be used introduced into a first zone ($Z_1$) of the twin-screw extruder, which zone is equipped with single-flight screw conveying elements which are arranged in a length region beginning from 0 to 3/100 and ending at least at 8/100 and at most at 30/100 of the total screw length L, the low-viscosity mixture is then passed through a mixing zone ($Z_2$) having a small shearing effect and comprising double-flight screw conveying elements and/or mixing elements, this mixing zone ($Z_2$) being arranged within a length region from 8/100 to 45/100 with a total length within this region of from 5/100 to 25/100 of the total screw length L, the product is then passed into a retarding zone ($Z_3$) having little shearing effect, this retarding zone ($Z_3$) being arranged within a length region from 20/100 to 50/100 with a total length of the retarding stage within this region of from 0.2/100 to 10/100 of the total screw length L, the polymerization is then carried out at high viscosity in a polymerization zone ($Z_4$) equipped with double-flight conveying screws, the zone ($Z_4$) being present in a length region from 30/100 to 100/100 of the total screw length L, and the polyurethane is discharged, with the proviso that the process is carried out in such a way that the value E, defined as $$E = \frac{M \times n \times D_G^2}{V},$$

where

M—is the total torque, in [Nm], acting on the two extruder shafts, n—is the speed of the extruder screws in [min$^{-1}$], $D_G$—is the smallest internal diameter of the extruder barrel in [cm] and V—is the free reactor volume available between the extruder barrel and the screw elements and any other elements as equipment on the extruder shafts in [cm$^3$], is greater than 750.

It has surprisingly been found that the polyurethane melt contains an extremely small amount of impurities when E is maintained above 750 with the described screw configuration having, in contrast to the procedures to date, little shearing effect, in the reaction extruders of various size and design.

Less than 1 g of impurities is retained on a filter having a mesh size of 42 μm after 1 ton of polyurethane melt has passed through.

DETAILED DESCRIPTION OF THE INVENTION

Regarding the starting components for the preparation of the novel thermoplastic polyurethanes, the following may be stated:

a) Examples of suitable organic and/or modified organic polyisocyanates (a) are aliphatic, cycloaliphatic, araliphatic, aromatic and heterocyclic diisocyanates. Specific examples are aliphatic diisocyanates, such as hexamethylene diisocyanate, preferably cycloaliphatic diisocyanates, such as isophorone diisocyanate, cyclohexane 1,4-diisocyanate, 1-methylcyclohexane 2,4- and 2,6-diisocyanate and the corresponding isomer mixtures, and dicyclohexylmethane 4,4'-, 2,4'- and 2,2'-diisocyanate and the corresponding isomer mixtures.

Diisocyanates which are particularly preferred according to the invention are aromatic diisocyanates, such as naphthylene 1,5-diisocyanate, 3,3'-dimethyl-4,4'-diisocyanatodiphenyl (TODI), 1,4-diisocyanatobenzene and the corresponding hydrogenated product, toluylene diisocyanates and in particular the diphenylmethane diisocyanate isomers. 4,4'-Diisocyanatodiphenylmethane or its isomer mixture with up to 5, preferably from 1 to 4, mol % of 2,4-diisocyanatodiphenylmethane, generally accompanied by very small amounts of the 2,2'-diisocyanatodiphenylmethane isomer, is particularly preferred. It is also possible to use prepolymers of polyisocyanates and the members of components (b) and, if required, (c) having terminal isocyanate groups instead of the polyisocyanates or together with these as a mixture. The stated diisocyanates may, if required, be used together with up to about 15 mol % (based on diisocyanate) of a polyisocyanate having a higher functionality. However, the amount of the polyisocyanate having a higher functionality must be limited so that a still fusible or thermoplastic polyurethane is obtained. A larger amount of isocyanates having a higher functionality must in general be compensated by the concomitant use of isocyanates and/or compounds (e) which on average are less than difunctional with respect to isocyanates, thus avoiding excessive chemical crosslinking of the product.

b) Preferred relatively high molecular weight oligomeric polyhydroxy and/or polyamino compounds (b) having average molecular weights of from 400 to 10 000 g/mol are polyester diols, polyestercarbonate diols and polyether diols, for example polyester diols obtained from straight-chain or branched aliphatic and/or cycloaliphatic diols and aliphatic dicarboxylic acids, in particular adipic acid. However, they may also contain minor amounts of aromatic dicarboxylic acids, in particular phthalic acid and, if required, also terephthalic acid, and the hydrogenation products thereof. Hydroxypolycarbonates and hydroxypolycaprolactones are also suitable.

In a preferred embodiment, a 1,4-butanediol adipate polymer having an average molecular weight of from 1500 to 4000 g/mol or a copolyester diol obtained from butanediol, ethanediol and adipic acid and having an average molecular weight of from 1500 to 4000 g/mol are used.

Hydroxyetherdiols based on ethylene oxide or propylene oxide or copolyethers obtained from propylene oxide and/or ethylene oxide and/or tetrahydrofuran, for example hydroxyether diols based on tetrahydrofuran and having a molecular weight of from 1000 to 3000, are also preferred. Suitable polyols are described, for example, in DE-A-23 02 564, 24 23 764, 24 47 368, 25 49 372 or 42 02 972.

Higher molecular weight polyamine compounds, preferably having primary aromatic amino groups, may, if required, also be used. Preferred members are prepared, for example, by hydrolysis (preferably basic hydrolysis) of corresponding NCO prepolymers based on relatively high molecular weight polyhydroxy compounds and excess aromatic diisocyanates. Examples of these processes are given in DE-A-29 48 419, DE-A-30 39 600, DE-A-31 12 118, EP-A-61 627, EP-A-71 132 and EP-A-97 869. DE-A-29 48 419 also describes further prior art processes for the preparation of aromatic amino compounds having a relatively high molecular weight structure, ie. aminopolyethers, such as those which are suitable for the novel process. Further preparation processes are described in German Published Applications DAS 1,694,152 and DAS 1,155,907 and French Patent 1,415,317.

The use of prepolymers of polyisocyanates (a) and the components (b) and, if required, (c) having terminal groups containing Zerewitinoff-active hydrogen atoms and of mixtures of these prepolymers with the substances (b) and (c) described is also possible.

c) Suitable chain extenders (c) having at least two Zerewitinoff-active hydrogen atoms and an average molecular weight of less than 400 g/mol are, for example, aliphatic diols of 2 to 12, preferably 2, 4 or 6, carbon atoms, such as ethanediol, 1,6-hexanediol, diethylene glycol, dipropylene glycol and in particular 1,4-butanediol. However, diesters of terephthalic acid with glycols of 2 to 4 carbon atoms, eg. bisethylene glycol terephthalate or bis-1,4-butanediol terephthalate, hydroxyalkyl ethers of hydroquinone, eg. 1,4-di-(β-hydroxyethyl)-hydroquinone, (cyclo)aliphatic diamines, eg. 4,4'-diaminodicyclohexylmethane, 3,3'-dimethyl-4,4'-diaminodicyclohexylmethane, isophoronediamine, ethylenediamine, 1,2- and 1,3-propylenediamine, N-methyl-1,3-propylenediamine or N,N'-dimethylethylenediamine, and aromatic diamines, eg. 2,4- and 2,6-toluylenediamine, 3,5-diethyl-2,4- and -2,6-toluylenediamine and primary ortho-dialkyl-, trialkyl- and/or tetraalkylsubstituted 4,4'-diaminodiphenylmethanes, are also suitable.

According to the invention, in particular low molecular polyalcohols, preferably diols, diamines, aliphatic diamines, hydrazines and hydrazide derivatives are used. Toluylenediamines and isophoronediamine are noteworthy diamines. Aminoalcohols such as diethanolamine and N-methyldiethanolamine, are also suitable according to the invention. Preferred chain extenders are diols, such as di- and triethylene glycol, 1,6-hexanediol and hydroquinone di-β-hydroxyethyl ether, and particularly preferably 1,4-butanediol, if necessary as mixtures with other diols.

Further preferred chain extenders (c) having an average molecular weight of less than 400 g/mol are, for example, the compounds described in DE-A-23 02 564, 24 23 764, 24 47 368, 25 49 372, 28 42 806 or 42 02 973.

d) Suitable catalysts (d) which may be used in particular in order to accelerate reaction between the NCO groups of the diisocyanates (a) and the hydroxyl groups of the components (b) and (c) are the conventional tertiary a/nines known from the prior art, for example triethylamine, dimethylcyclohexylamine, N-methylmorpholine, N,N'-dimethylpiperazine, 2-(dimethylaminoethoxy)ethanol, diazabicyclo[2.2.2]octane and the like, and in particular organometallic compounds, such as titanium compounds, for example titanic acid esters, iron compounds, eg. iron(III) acetylacetonate, lead compounds, such as lead acetate, tin compounds, eg. tin diacetate, tin dioctoate, tin dilaurate or the dialkyltin salts of aliphatic carboxylic acids, such as dibutyltin diacetate, dibutyltin dilaurate or the like. The catalysts are usually used in amounts of from 0.001 to 0.1 part per 100 parts of polyhydroxy compound.

e) Compounds which are less than difunctional with respect to isocyanates and/or less than difunctional isocyanates (e) may be required to avoid excessive crosslinking of the thermoplastic polyurethane, as may be caused by the use of polyisocyanates having a higher functionality.

Monofunctional compounds used are, for example, monoamines, such as butylamine, dibutylamine, hydroxylamine, stearylamine or N-methylstearylamine, and monoalcohols, such as butanol, 1,2-ethylhexan-1-ol, dodecan-1-ol, isobutanol or tertbutanol, cyclohexanol or ethylene glycol monomethyl ether and stearyl alcohol.

f) The conventional assistants and/or additives can of course be incorporated before and/or during and/or after the polyurethane reaction. Examples are lubricants, inhibitors, hydrolysis stabilizers, light stabilizers, heat stabilizers, stabilizers against discoloration, dyes, pigments, inorganic and/or organic fillers, reinforcing agents and plasticizers, as well as plastics which can be melted by a thermoplastic method.

Preferably used lubricants and/or mold release agents are waxes or oils, as well as, for example, long-chain compounds having carboxyl, ester, antido, urethane or urea groups and also silicones.

In particular, known ester compounds, for example dioctyl phthalate and/or dinonyl adipate, etc., are used as plasticizers.

Plastics which are suitable according to the invention and can be melted by a thermoplastic method are, for example, thermoplastic polyurethanes which are produced in a separate synthesis step according to the prior art, ABS graft copolymers prepared in a known manner from the monomers acrylonitrile, butadiene and styrene or α-methylstyrene, polyethylene and polypropylene, copolymers of ethylene and other olefins, PVC, polycarbonates and other thermoplastics known per se.

Further information on the abovementioned assistants and additives appears in the technical literature, for example in the monograph by J. H. Saunders and K. C. Frisch High Polymers, Volume XVI, Polyurethane, Parts 1 and 2, Interscience Publishers 1962 and 1964, or in DE-A-28 54 409, 29 20 501, 33 29 775 and 34 05 531.

The amounts of reactants (a) to (f) are chosen so that the molar ratio of isocyanate groups to Zerewitinoff-active groups is from 0.9 to 1.15, preferably from 0.95 to 1.05. The fluctuations in the metering of the substances which carry these groups must be less than 0.5% according to the invention.

The reaction extruders used are conventional twin-screw extruders in which both screws rotate in the same direction and which have a length/diameter ratio of from 20 to 60.

The type of screw elements used as an essential part of the invention is described, for example, in the appropriate company publications of Leistritz Aktiengesellschaft, Nürnberg, or of Werner und Pfleiderer GmbH, Stuttgart.

Examples are the elements stated in the company publication, of Leistritz Aktiengesellschaft for twin-screw extruder LSM 30.34 GL (Publication No. 1.3.–11), for equipping the extruder shafts GFA 1-30-R 2, GFA 1-30-R as single-flight screw conveying elements, GFA 2-60-R, GFA 2-45 R, GFA 2-30 R, GFA 2-20-R as double-flight screw conveying elements of different pitches and the slotted retarding elements ZSS 1-R4 which are intended for the extruder having counter-rotating screws and may also be used in the extruder having co-rotating screws. The elements essential for equipping extruder shafts of twin-screw extruders having corotating screws are likewise described in the company publication Zweiwelliger Schneckenkneter ZSK, Wissenswertes über Entwicklung und Verfahrenstechnik, 05119/1-1,5-VIII.91KODÖ from Werner und Pfleiderer. Werner und Pfleiderer also refer to a twin-screw extruder having co-rotating screws as a twin-screw kneader, abbreviated to ZSK.

The reaction of the components a) to f) to give the novel thermoplastic polyurethane is carried out in the four successive zones $Z_1$ to $Z_4$ of the extruder, each of which has a length of $z_1$ to $z_4$ and which sum to give the total screw length L, ie.

$$z_1+z_2+z_3+z_4=L$$

According to the invention, the first zone ($Z_1$) of the twin-screw extruder, having a length $z_1$, is equipped with single-flight screw conveying elements which are arranged in a length region beginning from 0 to 3/100 and ending at least at 8/100 and at most at 30/100 of the total screw length L.

It is surprising that the feed of the very low-viscosity reaction components by means of single-flight elements which have little mixing effect and are actually intended for forced axial transport of highly viscous melt and for feeding solid substances is essential for reducing the inhomogeneities formed in the polyurethane melt. However, if single-flight screws are not used for the feed but for pressure build-up, as stated in Example 1 of DE-A-24 47 368, there are various disadvantages. In the case of the pressure build-up in the low-viscosity region up to the retarding zone, a considerable increase in the content of inhomogeneities in the polyurethane melt occurs before the retarding zone when single-flight elements are used. When single-flight elements are used for conveying and final reaction downstream, reactor volume is wasted (single-flight screws have a smaller free volume than double-flight ones) and the mixing effect of double-flight screws in the high-viscosity region is lost, which in turn leads to inhomogeneous melts.

The low-viscosity mixture is then passed through a mixing zone ($Z_2$) comprising double-flight screw conveying elements having a small shearing effect, some of which may be replaced by mixing elements having little shearing effect. For example, screw mixing elements in the form of conveying screws having passages, as shown, for example, in FIG. 28 of the stated company publication from Werner und Pfleiderer, are used as mixing elements having little shearing effect, within the mixing zone ($Z_2$) otherwise containing double-flight conveying elements. According to the invention, kneading elements are suitable as such mixing elements only when, in contrast to DE-A-23 02 564, 24 37 764, 25 49 372 and 28 42 806 or WO 91/00304, they are designed to have little shearing effect and a stronger mixing action. Such a combination of kneading elements is shown, for example, in FIG. 34 on page 19 of the stated company publication from Werner and Pfleiderer. It is clear from this figure that different screw elements, in this case kneading elements, have a different shearing effect on the product present in a twin-screw kneader. For example, the use of broader kneading disks with an otherwise identical arrangement results in greater shearing, and greater shearing is also achieved by decreasing the conveying effect in the case of kneading disks of the same width. This example shows that, in addition to the shearing effect, the mixing effect of the screw elements is also dependent on their geometry; thus, the mixing effect can be varied relatively independently alongside the shearing effect in a simple manner by means of the width and arrangement of kneading disks.

These relationships are well known to a person skilled in the art and it is entirely permissible to assume these different shearing, mixing and retarding effects of the screw elements in the case of a reaction taking place in an extruder. The terms strongly or weakly shearing, strongly or weakly mixing, strongly or weakly conveying and strongly or weakly retarding are accordingly clearly defined for a person skilled in the art, although a quantitative, numerical description of these effects is unknown to date and unusual. These terms are therefore used as known technical designations in technical publications and patents.

Kneading elements having a strongly shearing effect may provoke the precipitation of hard segments as inhomogeneities in the sensitive phase of the reaction in the mixing zone ($Z_2$) at viscosities below 10 Pa.s. If strongly shearing kneading elements are placed in a higher viscosity range above 10 Pa.s according to the abovementioned German Laid-Open Applications or even above 100 Pa.s according to WO 91/00304, slight nodule formation can be reduced to a certain extent but, in spite of the self-purging, the formation of insoluble hard segments is observed especially after a relatively long running time, said hard segments remaining on and adhering to the kneading elements. From time to time, these particles then become detached and, although they can for the most part be removed by sieving, they are formed in a total amount of well over 20 ppm and hence cause the stated problems.

It has been found that the separation of the inhomogeneities is more or less already complete in a viscosity range of the polyurethane-forming components above 10 Pa.s. The stated publications accordingly propose the destruction of resulting particles under strong shearing. According to the invention, however, it is better to prevent the formation of inhomogeneities, which can separate out, in the viscosity range below 10 Pa.s, the described mixing effect with little shearing being surprisingly suitable for this purpose. The viscosity of the polyurethane being formed is a measure of the degree of polymerization. If thermoplastics are included as component (f) in the reaction mixture, the viscosity of the total amount of substances is of course higher than 10 Pa.s but the viscosity of the polyurethane being formed in this mixture is less than 10 Pa.s, ie. in a range of the degree of polymerization which is critical with regard to hard segment formation and which is influenced in the manner according to the invention to prevent inhomogeneities.

In a preferred manner according to the invention, it is also possible to utilize the purely mixing effect of the double-flight conveying elements in the mixing zone ($Z_2$). If the viscosity of the reacting mixture is monitored in a separate experiment outside the extruder at comparable temperatures, for example in a viscometer or in a laboratory kneader registering the viscosity, the viscosity of the mixture at a specific point in the extruder can be determined as a function of the reaction time.

The mixing zone ($Z_2$) is arranged within a length region from 8/100 to 45/100 of the total screw length L and, within this region, has a total length $z_3$ of from 5/100 to 25/100 of the total screw length L.

The product is then passed into a retarding zone ($Z_3$). The retardation of the mixture having a very low degree of polymerization of the polyurethane by means of retarding zone $Z_3$ having little shearing effect but a good mixing effect is of decisive importance for obtaining the novel product. In the simplest case, this is done by reducing the screw pitch of the double-flight conveying elements. However, it is also possible to use retarding elements having little shearing effect but a good mixing effect, for example the abovementioned slotted retarding elements, as described in the stated company publication from Leistritz Aktiengesellschaft, Nürnberg, for extruders having counter-rotating screws and/or screw conveying elements rotating in an anticlockwise direction and/or kneading elements having little shearing effect and a good mixing effect and/or the screw mixing elements already described. The latter have the desired retarding and mixing effect, owing to the back-flow into the passages in the intermeshing regions of the screws, possibly associated with a reduction in the screw pitch. Retarding elements having a strong shearing effect, such as retarding disks, or kneading elements having a strong shearing and slight mixing effect are unsuitable for the novel retardation of the low-viscosity mixture since the precipitation of inhomogeneities can be brought about by the strong shearing.

The retardation zone ($Z_3$) is located within a length region from 20/100 to 50/100 of the total screw length L and has a total length $z_3$ within this region of from 0.2/100 to 10/100 of the total screw length L.

The polymerization in the high-viscosity range is then continued in a polymerization zone ($Z_4$) which is equipped with double-flight conveying screws. In this section, in particular in the final part of the screw before the discharge of the polyurethane, there is no longer any pronounced chemical conversion but the small residual conversion results in a substantial increase in the degree of polymerization. It is therefore incorrect to consider this zone as a pure conveying zone for the melt.

The kneading elements in this section which are described in DE-A-23 02 564, 24 37 764, 25 49 372 and 28 42 806 evidently interfere with the course of this reaction, lead to considerable deposits and greatly increase the impurities in the melt.

Contrary to the opinions to date, the lack, according to the invention, of such kneading elements in the polymerization zone ($Z_4$) leads to a particularly clean product.

The zone ($Z_4$) having the length $z_4$ is located in a length region from 30/100 to 100/100 of the total screw length L.

The thermoplastic polyurethane is then discharged in the usual manner and subjected to a shaping procedure.

According to the invention, the process is carried out in such a way that the components a) to f) are either fed individually via separate lines into the extruder or are added completely or partly as a premix. Any premixes of the starting components, which are prepared before introduction with conventional mixing units, are used. It is also possible to divide up the flow of individual components or premixes.

The components a) to e) and the liquid assistants and additives f), the premixes thereof and amounts of the components a) to f) or of the premixes which have been separated from the total amount may be introduced into the extruder at one or more points. The feed is preferably effected at the single-flight screw section of zone $Z_1$. The liquid assistants and additives f) and catalysts d) and the residual amounts of the components a) to c) and e) and of the premixes may also be added at a downstream point.

Solid assistants and additives f) are advantageously introduced into the extruder after the retarding zone ($Z_3$) or introduced at the single-flight screw section ($Z_1$) before the addition of the components a), b), c) and e).

The molar ratio of isocyanate groups to all Zerewitinoff-active hydrogen atoms involved in the reaction is, according to the invention, from 0.9 to 1.15. The metering fluctuations for the substances carrying these groups must be less than 0.5%.

The process is carried out, according to the invention, in such a way that the ratio of the product of the torque M, in [Nm], acting on the extruder shafts, the speed n of the extruder screws in [min$^{-1}$] and the square of the smallest internal diameter of the extruder barrel $D_G$ in [cm] to the free reactor volume V available between the extruder barrel and the screw elements and any other elements as equipment on the extruder shafts in [cm$^3$] is greater than 750.

This gives a value E, defined as $$E = \frac{M \times n \times D_G^2}{V},$$

where

M—is the total torque, in [Nm], acting on the two extruder shafts, n—is the speed of the extruder screws in [min$^{-1}$], $D_G$—is the smallest internal diameter of the extruder barrel in [cm] and V—is the free reactor volume available between the extruder barrel and the screw elements and any other elements as equipment on the extruder shafts in [cm$^3$], which must be greater than 750 in order to obtain a product which is pure according to the invention.

Screw geometry cannot be theoretically determined in an unambiguous manner even for relatively simple extrusion tasks without accompanying chemical reaction in a twin-screw kneader. This is evident from, inter alia, the stated company publication from Werner und Pfleiderer, page 17. Accordingly, it is not possible to calculate the geometry or to explain it theoretically with the present state of knowledge for the much more complicated case of reactive extrusion. In contrast to geometries known to date, it is surprising that by using these relatively simple combinations of geometries the purity criterion of an inhomogeneity content of less than 1 g per ton of melt can be fulfilled if the novel value E is simultaneously maintained above 750. When establishing the E value, the melt flow must be unhindered by the process. This is the case when the flow resistances for the melt correspond to the process with unhindered operation. Highly coated melt filters influence, for example, the E value in a manner not according to the invention. In this case, the applicable E value is the one shortly after insertion of a fresh filter or in the absence of a filter. In the novel procedure, ie. with establishment of an E value above 750 with free passage through the filter, the amount of deposits formed is however so small that there is always unhindered melt flow.

The E value is brought, according to the invention, within the required region above 750, preferably greater than 950, particularly preferably more than 1100, by varying the amounts of catalyst, the barrel temperatures and the throughput. The barrel temperatures may vary from 80° to 280° C., preferably from 120° to 260° C., particularly preferably from 140° to 260° C. According to the invention, the residence time in the extruder is from 0.3 to 5, preferably from 0.5 to 3, minutes. The rotational speeds are from 120 to 450, preferably from 170 to 300, revolutions per minute.

The examples which follow illustrate the invention.

Two commercial twin-screw kneaders were used:

| Extruder I: | Leistritz twin-screw laboratory extruder with co-rotating system LSM 30.34 GL | |
|---|---|---|
| | Reactor volume V: | 550 cm$^3$ |
| | Screw diameter D: | 34 mm |
| | Screw length: | 35 D |
| | Max. continuous operating torque as sum for both screws: | 246 Nm |
| | Heating zones: | 10 |
| | Barrel: | 10 |
| | Metering of liquid substances by means of piston metering pumps, accuracy of metering: | ≦0,5% |
| | Metering of solid substances into open barrels by means of metering balances having the ranges from 1 to 20 kg/h and 20 to 5 kg/h. Melt discharge from 3 dies with underwater granulation. Use of a melt filter, minimum mesh size 42 µm, for controlling the purity of the melt; normal synthesis without filter. | |
| Extruder II: | Twin-screw kneader ZSK 58 from Werner und Pfleiderer | |
| | Reactor volume V: | 5800 cm$^3$ |
| | Screw diameter D: | 58 mm |
| | Screw length: | 48 D |
| | Maximum torque as sum for both screws: | 1000 Nm |
| | Heating zones; | 8 |
| | Barrel: | 12 |
| | Metering of liquid substances by means of gear pumps, gravimetrically controlled, accuracy of metering: | ≦0.5% |
| | Metering of solid substances into open barrels by means of metering balances in a known manner; melt filtration by means of melt filter in a known manner, 5-layer filters, minimum mesh size 42 µm. Discharge via die strip/knife roll granulation. | |

The purity of the melt was determined by weighing the residues on the melt filter after removing the adhering thermoplastic polyurethane with N,N-dimethylformamide containing 1% of di-n-butylamine at 70° C. for 16 hours. The weighed amount was based on one ton of melt which had passed through. These measurements were carried out using 5-layer melt filters from Hayer und Boecker, whose finest filter had a mesh size of 42 µm. Any inhomogeneities which had remained behind in other filter layers having a coarser mesh size and located before the 42 µm filter were also taken into account.

These layers having a coarser mesh size are required to support the fine 42 µm filter since, under the melt pressures of about bar, the 42 µm filter alone would not withstand the melt flow. However, since it may be assumed that the particles retained by filters having a coarser mesh size would also be retained on the 42 µm filter, we refer only to this filter.

A further purity criterion used was the visual assessment of injection moldings produced from the polyurethane prepared and extruded tubes, by means of which it was ascertained that no inhomogeneities had passed through the filter.

In addition, the change in the melt pressure at constant throughput provided information about the extent of coating of the melt filter. (In the case of a higher content of inhomogeneities in the melt, said inhomogeneities are retained by the filter, whose flow resistance and hence the melt pressure continue to increase.)

If the melt pressure reaches an upper limit, purely mechanical reasons make it necessary to change the filter. In this sense, the filter operating time up to the point when this critical melt pressure is reached is also a measure of the coating of the filter and hence of the purity of the melt.

Since, at a different melt pressure, other process parameters may also change, especially since there are differences from formulation to formulation, these mechanical parameters, melt pressure and filter operating time, provide only relative information about the purity of the polyurethane melt. On the other hand, the weighing of the residues on the filter is a parameter which provides reliable information about the content of impurities in the melt, independently of the process parameters.

EXAMPLE 1

(Comparison)

The following substances were introduced into barrel No. 1 of extruder II having a screw corresponding to DE-A-23 02 564, 24 23 764, 25 49 372 and 28 42 806, ie. having, in the conveying direction, 480 mm double-flight conveying elements, 540 mm kneading elements (1st kneading zone) having a strongly shearing effect, 280 mm double-flight conveying elements, 210 mm shearing kneading elements (2nd kneading zone), 400 mm double-flight conveying elements, 210 mm shearing kneading elements (3rd kneading zone) and 760 mm double-flight conveying elements:

| | |
|---|---|
| 88.170 kg/hour | of a polyesterol obtained from adipic acid, 1,4-butanediol and 1,2-ethanediol; OH number: 46.3 mg KOH/g; acid number 0.44 mg KOH/g; water content 0.02%; introduction temperature: 120° C. |
| 84.070 kg/hour | of diphenylmethane 4,4'-diisocyanate, introduction temperature 65° C. |
| 26.885 kg/hour | of 1,4-butanediol, introduction temperature 85° C. |
| 1.60 kg/hour | of a mixture of N,N'-ethylenebisstearamide (UNIWAX ® 1760, from Unichema) and hardened castor oil (LOXIOL ® G15, from Henkel) in a ratio of 3:5 |
| 0.440 kg/hour | of 2,2',6,6'-tetraisopropyldiphenylcarbodiimide (Lupragen ® VP 9119, Elastogran GmbH). |

The temperature profile in the 8 zones was characterized by the heating zone temperature as follows:

| Heating zone No. | 1 | 2 | 3 | 4 | 5 | 6 | 7 | 8 |
|---|---|---|---|---|---|---|---|---|
| Temp. °C. | 190 | 200 | 200 | 190 | 180 | 180 | 190 | 200 |

The speed n was 100/min.

Before the beginning of the synthesis, the screw consisted of untreated metal.

When the described melt filter having the smallest mesh size of 42 μm was used, the synthesis was virtually impossible to carry out after a machine running time of about 2 hours, since the melt pressure reached the permitted maximum value of 180 bar as a result of the filter coating no later than half an hour after the relevant filter change, necessitating a further filter change. The weighing gave values of from 40 to 60 g of retained inhomogeneities per ton of melt on the filter.

In particular, the kneading zones were covered with solid coatings after a longer machine running time of 8 hours without a melt filter, and said coatings could no longer be removed in N,N-dimethylformamide containing 1% of di-n-butylamine at 70° C.

When a filter having a larger mesh size of 70 μm was used, the process could to some extent be controlled, and a polyurethane which had the following properties after injection molding of the granules was formed.

| | |
|---|---|
| Shore hardness D, DIN 53 505: | 53 |
| Tensile strength in MPa, DIN 53 504: | 55 |
| Elongation at break in %, DIN 53 504: | 460 |
| Abrasion in mm³, DIN 53 516: | 52 |
| Tear strength in N/cm, DIN 53 515: | 1420 |

The assessment of the filter and of the polyurethane moldings showed that the inhomogeneities could not be completely retained.

With this screw type according to the prior art, it is thus possible to produce a high-quality polyurethane in terms of mechanical characteristics, but the purity of the melt does not correspond even roughly to the requirement for a content of inhomogeneities of less than 1 ppm. With regard to the expense of filtration and the required cleaning of the screws after a relatively short running time, the process therefore has the considerable disadvantage of expensive additional work which interferes with continuous preparation, apart from the risk of contamination of the polyurethane.

EXAMPLE 2

(Comparison)

The same polyurethane as in Example 1 was produced in extruder II, except that a novel screw combination of the following type was used:

| | Percent of total length of the screw L |
|---|---|
| Region having single-flight conveying elements | 22 |
| Mixing zone comprising double-flight conveying elements having a high pitch | 22 to 39 |
| Retardation stage at transition of pitch | at 39 |
| Double-flight conveying screw having a low pitch | 39 to 100 |

Important process parameters were:

| | |
|---|---|
| Speed of the screws in min⁻¹ | 222 |
| Torque M for unhindered melt flow (at the beginning of the process, after filter change) in Nm | 476 to 550 |
| E value | 613 to 708 |

According to the invention, the solid LOXIOL® G 15/UNIWAX® 1760 mixture was added before the addition of polyol, diphenylmethane diisocyanate and butanediol, at the single-flight screw section.

The following inhomogeneities were measured on the 42 μm filter by weighing:

| Duration of synthesis in hours | Inhomogeneities in ppm |
|---|---|
| 7.0 | 0.22 |
| 16.4 | 2.74 |
| 21.3 | 1.22 |
| 27.8 | 2.07 |

It was found that a considerable reduction in the content of inhomogeneities is achieved using the novel screw configuration. However, at a E value of less than 750, contents below 1 ppm cannot be achieved, with the result that the operating times of the filters are still unsatisfactorily short, being in the range of from 1.5 to 2 hours.

The mechanical properties of the polyurethane free of inhomogeneities and after injection molding were as follows:

| | |
|---|---|
| Shore hardness D, DIN 53 505: | 52 |
| Tensile strength in MPa, DIN 53 504: | 56 |
| Elongation at break in %, DIN 53 504: | 473 |
| Abrasion in $mm^3$, DIN 53 516: | 48 |
| Tear strength in N/cm, DIN 53 515: | 1467 |

The values were thus of the same order of magnitude as in Example 1.

EXAMPLE 3

(According to the Invention)

The polyurethane was synthesized similarly to Examples 1 and 2 using the screw configuration according to Example 2.

However, a higher value for the parameter E was obtained by changing the throughput and the temperature profile and by the continuous addition of 15 ppm (based on the amount of polyol plus 1,4-butanediol) of tin(II) octoate as a 5% strength solution in dinonyl adipate to the 1,4-butanediol stream with the aid of an HPLC pump and an increase in the rotational speed.

With otherwise unchanged conditions, the material streams were adjusted as follows to change the throughput:

| | |
|---|---|
| 110.210 kg/h | of polyesterol |
| 105.090 kg/h | of diphenylmethane 4,4'-diisocyanate |
| 33.610 kg/h | of 1,4-butanediol |
| 2.000 kg/h | of UNIWAX ®/LOXIOL ® |
| 0.555 kg/h | of Lupragen ® VP 9119 |

The temperature profile of the 8 heating zones was chosen as follows:

| Heating zone No. | 1 | 2 | 3 | 4 | 5 | 6 | 7 | 8 |
|---|---|---|---|---|---|---|---|---|
| Temperature (°C.) | 190 | 200 | 200 | 200 | 200 | 190 | 180 | 180 |

| | |
|---|---|
| Speed of the screws in rpm | 260 |
| Torque M in Nm | 600 to 690 |
| E value | 905 to 1041 |

The amount of inhomogeneities remained very low, even after relatively long running time:

| Duration of synthesis in hours | Inhomogeneities in ppm |
|---|---|
| 13 | 0.16 |
| 17.2 | 0.2 |
| 24.2 | 0.2 |

Owing to the low level of coating of the filter, the process proceeded very smoothly and there were scarcely any detectable pressure increases in the melt after filter operating times of 5 hours. When a novel screw combination was used in conjunction with an E value which was stable and above 750, a melt of higher purity was obtained.

Mechanical properties after injection molding were as follows:

| | |
|---|---|
| Shore hardness D, DIN 53 505: | 53 |
| Tensile strength in MPa, DIN 53 504: | 55.8 |
| Elongation at break in %, DIN 53 504: | 477 |
| Abrasion in $mm^3$, DIN 53 516: | 44 |
| Tear strength in N/cm, DIN 53 515: | 1560 |

They were thus of the same order of magnitude as in Examples 1 and 2.

EXAMPLE 4

(According to the Invention)

The synthesis was carried out using the same raw materials and the same throughput as in Examples 1 and 2.

The screw configuration was changed as follows:

| | Percent of the total length of the screw L |
|---|---|
| Region having single-flight conveying elements $Z_1$ | 22 |
| Mixing zone comprising double-flight conveying elements of high pitch $Z_2$ | 22 to 32 |
| Retardation stage comprising screw mixing element plus reduction of the screw pitch $Z_3$ | 32 to 39 |
| Double-flight conveying elements of low pitch $Z_4$ | 39 to 100 |

Catalysis: 15 ppm, based on polyol+butanediol, of tin(II) octoate

| | |
|---|---|
| Speed of the screws, n in rpm: | 250 to 280 |
| Torque M in Nm | 600 to 670 |
| E value | 870 to 1080 |

The content of inhomogeneities was determined as 0.4 and 0.36 ppm after 13.5 and 24.5 hours, respectively.

The virtually completely absent pressure increase in the melt even after a filter operating time of several hours indicated a constant low level of coating of the filter at these values.

The mechanical properties were once again within the usual expected range:

| | |
|---|---|
| Shore hardness D, DIN 53 505: | 53 |
| Tensile strength in MPa, DIN 53 504: | 56.5 |
| Elongation at break in %, DIN 53 504: | 475 |
| Abrasion in $mm^3$, DIN 53 516: | 38 |
| Tear strength in N/cm, DIN 53 515 | 1573 |

EXAMPLE 5

(Comparison)

During the synthesis according to Example 4, the E value was reduced by decreasing the speed of the screws and reducing the catalyst content.

| | |
|---|---|
| Speed n in rpm | 222 |
| Torque M in Nm | 570 |
| E value: | 733 |

The E value has fallen slightly below the novel minimum value of 750. The filter immediately showed an inhomogeneity content of 0.79 ppm, ie. when the synthesis was continued under these conditions the value of less than 1 ppm could no longer be ensured. After the old operating conditions according to Example 4, with E greater than 1000, had been reestablished, the inhomogeneity content once again decreased to 0.4 ppm.

The mechanical properties of the discharged and injection molded granules corresponding to the operating state of Example 5 were once again within the usual expected range.

EXAMPLE 6

(Comparison)

The following substances were introduced into extruder II (introduction temperatures as in Example 1):

| | |
|---|---|
| 94.260 kg/h | of polyesterol according to Example 1 |
| 43.350 kg/h | of diphenylmethane 4,4'-diisocyanate |
| 12.075 kg/h | of 1,4-butanediol |
| 0.330 kg/h | of Lupragen ® VP 9119 (cf. Example 1) |
| 0.450 kg/h | of a mixture of UNIWAX ® 1760 and LOXIOL ® (cf. Example 1) |

The screw geometry was chosen as in Example 2 or 3. The temperature profile of the heating zones was:

| Heating zone No. | 1 | 2 | 3 | 4 | 5 | 6 | 7 | 8 |
|---|---|---|---|---|---|---|---|---|
| Temperature (°C.) | 190 | 200 | 200 | 190 | 180 | 180 | 180 | 180 |

| | |
|---|---|
| Speed of the screws in rpm | 246 |
| Torque M in Nm | 179 |
| E value | 255 |

The E value of 255, well below the minimum value of 750 according to the invention, resulted in a melt having a very high inhomogeneity content, with the result the melt pressure increased very rapidly to the machine shutdown limit of 180 bar owing to coating of the filter. The use of a filter of 100 μm and subsequently of 160 μm showed the same effect.

EXAMPLE 7

(According to the Invention)

The same polyurethane as in Example 6 was produced in extruder II with the screw geometry according to Example 2 or 3, but after increasing the E value by adding 14 ppm of tin(II) octoate and changing the temperature profile of the heating zone as follows:

| Heating zone No. | 1 | 2 | 3 | 4 | 5 | 6 | 7 | 8 |
|---|---|---|---|---|---|---|---|---|
| Temperature (°C.) | 185 | 200 | 200 | 195 | 195 | 195 | 180 | 170 |

| | |
|---|---|
| Speed n in rpm | 204 |
| Torque M in Nm | 690 |
| E value | 816 |

The inhomogeneity content was 0.2 ppm after an operating time of 2.5 hours.

(Examples 6 and 7 show that the novel procedure leads to a large reduction in the inhomogeneity content even in the case of a softer formulation.)

The mechanical properties were in the expected range for the corresponding composition of the polyurethane having a Shore hardness of 85 A:

| | |
|---|---|
| Tensile strength in MPa, DIN 53 504: | 44.7 |
| Elongation at break in %, DIN 53 504: | 579 |
| Abrasion in mm³, DIN 53 516: | 38 |
| Tear strength in N/cm, DIN 53 515: | 769 |

EXAMPLE 8

(Comparison)

Extruder I having an extruder screw according to the invention 30 was used:

| | Percent of total length L |
|---|---|
| Compacting elements | 2 |
| Single-flight conveying elements $Z_1$ | 2–10 |
| Mixing zone comprising double-flight conveying elements of high pitch $Z_2$ | 10–22 |

Mixing, non-shearing kneading elements having a length of 2% of the total length L were present in the mixing zone.

| | |
|---|---|
| Retardation stage comprising double-flight conveying element of low pitch and slotted retarding element $Z_3$ | 22–25 |
| Double-flight conveying screw $Z_4$ | 25–100 |

The formulation corresponded to that in Example 1 but was corrected for a throughput of 12 kg/h. A premix of butanediol and polyol was fed in since it was not possible to meter in correspondingly small amounts of butanediol with a relative accuracy of ≦0,5%. The use of the assistants LOXIOL® G 15 and UNIWAX® 1760 was dispensed with.

Temperature profile

| Heating zone No. | 1 | 2 | 3 | 4 | 5 | 6 | 7 | 8 | 9 | 10 |
|---|---|---|---|---|---|---|---|---|---|---|
| Temperature (°C.) | 180 | 230 | 240 | 230 | 220 | 210 | 210 | 210 | 210 | 220 |

| | |
|---|---|
| Speed n in rpm | 290 |
| Torque M in Nm | 105 |
| E value | 640 |

A relatively inhomogeneous polyurethane was obtained when no melt filter was used. A content of inhomogeneities of 3.2 ppm was found on a filter introduced into the melt stream and having a mesh size of 42 μm. The mechanical properties of the polyurethane prepared corresponded to those stated in Examples 1 to 5.

EXAMPLE 9

(According to the Invention)

The synthesis was carried out as in Example 8, but the E value was increased in the manner according to the invention by changing the temperature profile and by adding 10 ppm of tin(II) octoate.

Temperature profile

| Heating zone No. | 1 | 2 | 3 | 4 | 5 | 6 | 7 | 8 | 9 | 10 |
|---|---|---|---|---|---|---|---|---|---|---|
| Temperature (°C.) | 190 | 210 | 210 | 190 | 190 | 180 | 180 | 190 | 200 | 220 |

| | |
|---|---|
| Speed n in rpm | 290 |
| Torque M in Nm | 197 |
| E value | 1200 |

The polyurethane was free of inhomogeneities, even in the absence of a melt filter. When a melt filter having a mesh size of 42 μm was used, a content of inhomogeneities of less than 0.3 ppm was determined.

The following mechanical characteristics were determined:

| | |
|---|---|
| Shore hardness D, DIN 53 505: | 61 |
| Tensile strength in MPa, DIN 53 504: | 58 |
| Elongation at break in %, DIN 53 504: | 450 |
| Abrasion in mm³, DIN 53 516: | 40 |
| Tear strength in N/cm, DIN 53 515: | 1469 |

Assistants such as UNIWAX® 1760 and/or LOXIOL® G 15 are known to reduce the hardness. It is therefore easy to explain why, in the present Example 9, the resulting hardness is higher than in the preceding examples of the same formulation.

EXAMPLE 10

(According to the Invention)

Extruder I having the screw described in Example 8 was used. The polyurethane-forming raw materials were metered into barrel No. 1 in the following ratio:

| | |
|---|---|
| 1000 g | of polyesterol obtained from adipic acid, 1,4-butanediol and 1,6-hexanediol; OH number 56.1 mg KOH/g; acid number 0.38 mg KOH/g; water content 0.03%; introduction temperature 95° C. |
| 95.8 g | of 1,4-butanediol, introduction temperature as for polyesterol |
| 17 g | of Stabaxol, introduction temperature as for polyesterol |

| | |
|---|---|
| 400 g | of diphenylmethane 4,4'-diisocyanate, introduction temperature 65° C. |

The non-isocyanate-containing components (component A) were added as a premix corresponding to Example 8, 50 ppm of tin(II) octoate having been added as catalyst to said premix beforehand. The metered streams of component A and the isocyanate were brought to a throughput of 10 kg/h. 5.4 kg/h of dibutyl phthalate were additionally added in barrel section No. 7 by means of a piston metering pump.

Temperature profile

| Heating zone No. | 1 | 2 | 3 | 4 | 5 | 6 | 7 | 8 | 9 | 10 |
|---|---|---|---|---|---|---|---|---|---|---|
| Temperature (°C.) | 210 | 220 | 240 | 230 | 220 | 210 | 190 | 160 | 140 | 120 |

| | |
|---|---|
| Speed n in rpm | 290 |
| Torque M in Nm | 138 |
| E value | 840 |

The TPU granules thus obtained were injection molded to give test specimens after storage for 7 days at room temperature. The visual assessment of these transparent test specimens for which the following characteristics were determined indicated excellent homogeneity.

| | |
|---|---|
| Shore hardness D, DIN 53 505: | 62 |
| Tensile strength in MPa, DIN 53 504: | 21.6 |
| Elongation at break in %, DIN 53 504: | 817 |
| Tear strength in N/cm, DIN 53 515: | 230 |
| Abrasion in mm³, DIN 53 516: | 34 |

EXAMPLE 11

(According to the Invention)

Extruder I having the screw described in Example 8 was used. The polyurethane-forming raw materials were metered into barrel No. 2 in the following ratio:

| | |
|---|---|
| 1000 g | of polyesterol obtained from adipic acid and 1,4-butanediol; OH number 44.9 mg KOH/g; acid number 0.34 mg KOH/g; water content 0.04%; introduction temperature 120° C. |
| 308.7 g | of 1,4-butanediol, introduction temperature as for polyesterol |
| 5.0 g | of Stabaxol 1 |
| 6.5 g | of Irganox 1010 |
| 960 g | of diphenylmethane 4,4'-diisocyanate, introduction temperature 65° C. |

The non-isocyanate-containing components (component A) were metered as in Example 8 in the form of a premix, 10 ppm of tin(II) octoate having been added as a catalyst to said premix beforehand. The metered streams of the polyurethane-forming raw materials were brought to a throughput of 12 kg/h. In addition, 4 kg/h of a copolymer based on ABS, of the type Terluran 996 S (BASF), were introduced into barrel section No. 1 via a gravimetrically controlled metering balance.

Temperature profile

| Heating zone No. | 1 | 2 | 3 | 4 | 5 | 6 | 7 | 8 | 9 | 10 |
|---|---|---|---|---|---|---|---|---|---|---|
| Temperature (°C.) | 180 | 230 | 240 | 230 | 220 | 210 | 210 | 210 | 210 | 220 |

| | |
|---|---|
| Speed n in rpm: | 290 |
| Torque M in Nm: | 153 |
| E value: | 930 |

The TPU/ABS blend was injection molded to give test specimens after storage for 3 days at room temperature. In spite of good contrast due to the white-yellowish coloration of the test specimens, no dark inhomogeneities were detectable. Checking of the characteristics gave the following:

| | |
|---|---|
| Shore hardness D, DIN 53 505 | 68 |
| Tensile strength in MPa, DIN 53 504 | 59.8 |
| Elongation at break in %, DIN 53 504 | 415 |
| Tear strength in N/cm$^2$, DIN 53 515 | 1382 |
| Abrasion in mm$^3$, DIN 53 516 | 52 |
| Charpy notched impact strength in kJ/m$^2$, according to DIN 53 453 | |
| −20° C. | 26 |
| −25° C. | 18 |
| −30° C. | 16 |
| Modulus of elasticity in MPa, DIN 53 457-Z | 290 |

We claim:

1. A process for the preparation of thermoplastic polyurethanes by reacting
   a) organic or modified organic polyisocyanates with
   b) at least one oligomeric polyhydroxy and/or polyamino compound having an average molecular weight of from 400 to 10 000 g/mol,
in the presence or absence of
   c) chain extenders having at least two Zerewitinoff-active hydrogen atoms and an average molecular weight of less than 400 g/mol,
   d) catalysts,
   e) compounds which are less than difunctional with respect to isocyanates and/or isocyanates which are less than difunctional and
   f) assistants and/or additives
in a twin-screw extruder in which both screws rotate in the same direction and which has a length/diameter ratio of from 20 to 60, and discharging the resulting thermoplastic polyurethane from the extruder with shaping, wherein at least some of the components a) and b) and of the components c) to f) which may also be used are introduced into a first zone ($Z_1$) of the twin-screw extruder, which zone is equipped with single-flight screw conveying elements which are arranged in a length region beginning from 0 to 3/100 and ending at least at 8/100 and at most at 30/100 of the total screw length L, the low-viscosity mixture is then passed through a mixing zone ($Z_2$) having a small shearing effect and comprising double-flight screw conveying elements or mixing elements, this mixing zone ($Z_2$) being arranged within a length region from 8/100 to 45/100 with a total length within this region of from 5/100 to 25/100 of the total screw length L, the product is then passed into a retarding zone ($Z_3$) having little shearing effect, this retarding zone ($Z_3$) being arranged within a length region from 20/100 to 50/100 with a total length of the retarding stage within this region of from 0.2/100 to 10/100 of the total screw length L, the polymerization is then carried out at high viscosity in a polymerization zone ($Z_4$) equipped with double-flight conveying screws, the zone ($Z_4$) being present in a length region from 30/100 to 100/100 of the total screw length L, and the polyurethane is discharged, with the proviso that the process is carried out in such a way that the value E, defined as $$E = \frac{M \times n \times D_G^2}{V},$$

where
   M—is the total torque, in [Nm], acting on the two extruder shafts,
   n—is the speed of the extruder screws in [min$^{-1}$],
   $D_G$—is the smallest internal diameter of the extruder barrel in [cm] and
   V—is the free reactor volume available between the extruder barrel and the screw elements and any other elements as equipment on the extruder shafts in [cm$^3$],
is greater than 750.

2. A process as claimed in claim 1, wherein the E value is adjusted by varying the barrel temperatures of the extruder from 80° to 280° C. or by changing the amount of catalyst or the total throughput.

3. A process as claimed in claim 1 or 2, wherein the starting materials a) to f) are fed into the extruder completely or partially as a premix or individually.

4. A process as claimed in any of claims 1 to 2, wherein the liquid assistants and additives f), the catalysts d) and amounts of the components a), b), c) and e) which are separated off from the total amount are fed into the extruder at one or more points.

5. A process as claimed in claim 3, wherein the liquid assistants and additives f), the catalysts d) and amounts of the components a), b), c) and e) which are separated off from the total amount are fed into the extruder at one or more points.

6. A process as claimed in any of claims 1 to 2, wherein solid assistants and additives f) are introduced into the extruder after the retarding zone ($Z_3$).

7. A process as claimed in claim 3, wherein solid assistants and additives f) are introduced into the extruder after the retarding zone ($Z_3$).

8. A process as claimed in any of claims 1 to 2, wherein solid assistants and additives f) are introduced before the addition of components a), b), c), and e) at the single-flight screw section ($Z_1$).

9. A process as claimed in claim 3, wherein solid assistants and additives f) are introduced before the addition of components a), b), c), and e) at the single-flight screw section ($Z_1$).

10. A process as claimed in any of claims 1, 2, 5, 7 or 9, wherein the molar ratio of isocyanate groups to all Zerewitinoff-active hydrogen atoms involved in the reaction is from 0.9 to 1.15 and the metering fluctuations for the substances carrying these groups are less than 0.5 percent.

11. A process as claimed in claim 4, wherein the molar ratio of isocyanate groups to all Zerewitinoff-active hydrogen atoms involved in the reaction is from 0.9 to 1.15 and the metering fluctuations for the substances carrying these groups are less than 0.5 percent.

12. A process as claimed in claim 6, wherein the molar ratio of isocyanate groups to all Zerewitinoff-active hydrogen atoms involved in the reaction is from 0.9 to 1.15 and the metering fluctuations for the substances carrying these groups are less than 0.5 percent.

13. A process as claimed in claim 8, wherein the molar ratio of isocyanate groups to all Zerewitinoff-active hydrogen atoms involved in the reaction is from 0.9 to 1.15 and the metering fluctuations for the substances carrying these groups are less than 0.5 percent.

14. A process as claimed in any of claims 1, 2, 5, 7, 9, 11, 12 and 8, wherein the residence time of the reacting melt in the extruder is from 0.3 to 5 minutes.

15. A process as claimed in claim 9, wherein the residence time of the reacting melt in the extruder is from 0.3 to 5 minutes.

16. A process as claimed in claim 6, wherein the residence time of the reacting melt in the extruder is from 0.3 to 5 minutes.

17. A process as claimed in claim 8, wherein the residence time of the reacting melt in the extruder is from 0.3 to 5 minutes.

* * * * *